United States Patent
Dreher et al.

(10) Patent No.: US 7,806,804 B2
(45) Date of Patent: Oct. 5, 2010

(54) METHOD FOR SHIFTING A GEAR IN A MULTI-STAGE GEARBOX OF A MOTOR VEHICLE AS A FUNCTION OF THE DRIVE INPUT SHAFT ROTATIONAL SPEED

(75) Inventors: Patrick Dreher, Bad Dürrheim (DE); Martin Seufert, Steinheim (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 12/695,086

(22) Filed: Jan. 27, 2010

(65) Prior Publication Data

US 2010/0160113 A1 Jun. 24, 2010

Related U.S. Application Data

(63) Continuation of application No. PCT/EP2008/006085, filed on Jul. 24, 2008.

(30) Foreign Application Priority Data

Jul. 27, 2007 (DE) .................. 10 2007 036 405

(51) Int. Cl.
*B60W 10/00* (2006.01)
(52) U.S. Cl. ...................................... 477/78
(58) Field of Classification Search .............. 477/77, 477/78; 701/54
See application file for complete search history.

(56) References Cited

U.S. PATENT DOCUMENTS 5,624,350 A * 4/1997 Bates ..................... 477/78
7,448,291 B2 11/2008 Stengel et al.

FOREIGN PATENT DOCUMENTS

DE 101 22 158 A1 11/2002

(Continued)

OTHER PUBLICATIONS

English Translation of International Preliminary Report on Patentability; Application No. PCT/EP2008/006085; Mar. 4, 2010.

*Primary Examiner*—Dirk Wright
(74) *Attorney, Agent, or Firm*—Knobbe, Martens, Olson & Bear, LLP

(57) ABSTRACT

Method for shifting, in particular engaging and/or disengaging, gears in an automatic multi-stage gearbox of a motor vehicle, wherein the gearbox comprises a drive input shaft (18) connectable to an engine drive output shaft (16) by means of a friction clutch (12) which acts as a separating clutch (12), and a drive output shaft (20) couplable to a drive wheel or to drive wheels of the motor vehicle, wherein a shift process takes place, in particular only, as a function of rotational speeds (n) of the shafts, wherein each gear is assigned a synchronizing device (36), which acts as a shift clutch, in order to connect the drive input shaft (18) to the drive output shaft (20), comprising the following steps: setting the separating clutch (12) into a dragging position such that a low, preferably predefined, drag torque is transmitted from the engine drive output shaft (16) to the drive input shaft (18), which drag torque is sufficient to bring a rotational speed ($n_{IS}$) of the drive input shaft (18) when the shift clutch (36) is open to a rotational speed ($n_M$) of the engine drive output shaft (16); adjusting the rotational speed of the engine drive output shaft (16) to a predetermined value (I) which differs sufficiently from a rotational speed of a source gear or from rotational speed of a target gear; setting the shift clutch (36) of the source gear towards an open position in order to separate the drive input shaft (18) and drive output shaft (20) from one another; detecting the rotational speed ($n_{IS}$) of the drive input shaft for a predetermined time period which follows at least a time ($t_1$) when the shift clutch (36) of the source gear is in the open position; determining a change in the rotational speed ($n_{IS}$) of the drive input shaft (18) during the predetermined time period; and determining whether the change which is determined in this way lies within predefined tolerances of an expected rotational speed change (FIG. 8).

18 Claims, 6 Drawing Sheets

FOREIGN PATENT DOCUMENTS

| | | |
|---|---|---|
| DE | 10 2005 036 895 A1 | 3/2006 |
| DE | 10 2005 004 339 A1 | 8/2006 |
| EP | 0 161 521 A | 11/1985 |
| JP | 63 072952 A | 4/1988 |

* cited by examiner

ENGAGING 1ST GEAR FROM STANDSTILL

DOWNSHIFTING FROM 4TH GEAR INTO 3RD GEAR

DOWNSHIFTING INTO NEUTRAL AT A STANDSTILL

*or HAS DRIVE OUTPUT SHAFT REACHED ENGINE ROTATIONAL SPEED

METHOD FOR SHIFTING A GEAR IN A MULTI-STAGE GEARBOX OF A MOTOR VEHICLE AS A FUNCTION OF THE DRIVE INPUT SHAFT ROTATIONAL SPEED

RELATED APPLICATIONS

This is a continuation application of the international patent application PCT/EP2008/006085 (WO 2009/015822 A1) filed on 24 Jul. 2008, which claims priority of the German patent application DE 10 2007 036 405 filed on 27 Jul. 2007, which is herewith fully incorporated by reference.

BACKGROUND OF THE INVENTION

The present invention relates to a method for shifting, in particular engaging and/or disengaging, gears in an automatic multi-stage gearbox of a motor vehicle, with the gearbox having a drive input shaft which can be connected to an engine drive output shaft by means of a friction clutch which acts as a separating clutch, and a drive output shaft which can be coupled to a drive wheel or to drive wheels of the motor vehicle, with a shift process taking place in particular only as a function of rotational speeds of the shafts, with each gear being assigned a synchronizing device, which acts as a shift clutch, in order to connect the drive input shaft to the drive output shaft.

RELATED PRIOR ART

Control methods for automatic gearboxes are disclosed in the German patent applications DE 101 22 158 A1, DE 10 2005 036 895 A1 and DE 10 2005 004 339 A1.

Automatic gearboxes such as dual-clutch gearboxes or automatic gearboxes require, for the engagement of gears, (travel) sensors in order to be able to detect the actual position of associated shift rods. As travel sensors, use is made for example of Hall elements. If a driver or a control unit which is responsible for performing shifts outputs a shift demand, the corresponding shift rod is moved from a present position into a desired position by means of a regulating loop (nominal position, feedback of present position by means of sensor).

If a travel sensor fails, the corresponding shift rod must be blocked and can no longer be moved. Otherwise, there is the risk that, with the shift rod engaged, a further shift rod is engaged, which would lead to destruction of the gearbox. However, the blocking has significant disadvantages for the availability of the motor vehicle. For example, if the sensor fails when a gear is engaged, then it is no longer possible, for example in a dual-clutch gearbox, for a further gear to be engaged in said partial gearbox. In an automatic gearbox, it is not possible at all for any gear to be engaged in this situation.

Therefore, it is proposed in the prior art to provide redundant sensors such that, in the event of a failure of one sensor, operation can continue using a redundant sensor. However, this results in higher production costs. More installation space is required. The control expenditure is higher. The control software must be designed correspondingly. A significant disadvantage is a lower level of reliability of the overall system. since twice as many sensors can fail.

SUMMARY OF THE INVENTION

The inventors have therefore addressed the problem of developing a method for operating an automatic motor vehicle gearbox, by means of which method shift processes can be carried out reliably without requiring information from travel sensors. In particular, the inventors have addressed the problem of providing an emergency program such that a gearbox can continue to be operated reliably even in the event of a failure of a (single) provided travel sensor.

This object is solved according to the invention by means of a method as mentioned at the outset, comprising the following steps: setting the separating clutch into a dragging position such that a low, preferably predefined, drag torque is transmitted from the engine drive output shaft to the drive input shaft, which drag torque is sufficient to bring a rotational speed of the drive input shaft when the shift clutch is open to a rotational speed of the engine drive output shaft; adjusting the rotational speed of the engine drive output shaft to a predetermined value which differs sufficiently from a rotational speed of a source gear or from rotational speed of a target gear; setting the shift clutch of the source gear towards an open position in order to separate the drive input shaft and drive output shaft from one another; detecting the rotational speed of the drive input shaft for a predetermined time period which follows at least a time when the shift clutch of the source gear is in the open position; determining a change in the rotational speed of the drive input shaft during the predetermined time period; and determining whether the change which is determined in this way lies within predefined tolerances of an expected rotational speed change.

The decision as to whether a new gear can be engaged or whether an old gear has actually been disengaged may be made without the presence of information of the corresponding travel sensor of the gear to be actuated. By virtue of the separating clutch being closed slightly such that a predefined drag torque is transmitted, and by virtue of the engine rotational speed being set to a value which differs sufficiently from the rotational speed of the source gear, the drive input shaft rotational speed will, with the shift clutch open, move in the direction of the previously set engine rotational speed. The greater the difference between the rotational speed of the drive input shaft of the gearbox with the shift clutch closed and the previously set engine rotational speed, the greater the change will be when the shift clutch is open.

If, contrary to expectations, a gear has not been disengaged, then during the supposed opening of the shift clutch, the drive input shaft and the drive output shaft of the gearbox would remain connected. The relatively low drag torque of the engine shaft is then not sufficient to bring the (still connected) gear train to the same rotational speed as the engine, that is to say the rotational speed of the drive input shaft will then not change. The expected change therefore does not occur. It is therefore known that the gear in fact has not been disengaged, even though this has been assumed.

However, if the sensor is merely defective and the gear has in fact been disengaged, then the change can be detected and one can therefore be certain that the gearbox continues to function correctly.

The present method may also be used in gearboxes which have no travel sensors whatsoever in their synchronizing devices.

It is therefore possible for travel sensors to not be installed at all or at least not installed with redundancy. A relatively small installation space is therefore required. The control unit expenditure is reduced, which is also reflected in relatively low software expenditure.

According to one preferred embodiment, the shift clutch of the source gear is reset if the rotational speed of the drive input shaft changes counter to an expected direction during the predetermined time period.

If the rotational speed does not change to the expected target value during the predetermined time period (time window), but rather changes to a different value (for example change to the rotational speed of the opposite (H-gate) or adjacent (shift roller) gear, or change to some other rotational speed), it may be assumed that a gear has been engaged which is opposite the gear to be disengaged. In this case, the disengagement process has been unsuccessful. The synchronizer position has been moved beyond its neutral position, and so it must subsequently be moved back. The method proposed here is capable of detecting and eliminating such a situation.

It is also advantageous if the method has the further step of an actuating force being exerted on a synchronizing device of the target gear.

In this way, it is possible, without information from a travel sensor, for a target gear to be engaged only by monitoring the drive input shaft rotational speed.

In a further embodiment, the shift process is stopped if the rotational speed change which is determined in this way lies outside the predefined tolerances about the expected rotational speed change.

This is a clear indication that a shift process has not been carried out successfully. To prevent the gearbox from being (severely) damaged or even completely destroyed, the shift process is stopped. In particular, the gear, a part of the gearbox or the entire gearbox is blocked.

Further, it is preferred for the separating clutch to remain in the dragging position during said predetermined time period.

Torque can be transmitted from the engine to the gear train only while the separating clutch is in the dragging position. To have sufficient time for the evaluation of the change, the separating clutch should remain in the dragging position at least for the duration of the time window required for the evaluation.

In a further embodiment, the method is used as an emergency program.

If a travel sensor of a conventional shift clutch fails, it is not necessary for a redundant travel sensor to be provided. To be able to shift, the method according to the invention is merely followed.

It is also advantageous (for example in a dual-clutch gearbox) if a switch is made into an automatic mode. In this way, sufficient time remains to pre-select the desired gear, as described.

Otherwise, in an automatic mode, shift processes are carried out only with an interruption in traction force, that is to say with the separating clutch fully open. In this way, it is possible to prevent force from being transmitted from the engine to the gearbox during the engagement or disengagement of a gear.

A further advantage is to be considered that of an engine intervention taking place at the same time as the setting of the separating and shift clutch.

An engine intervention may for example be obtained by adjusting a throttle flap of the engine. The rotational speed of the engine can be regulated in this way.

BRIEF DESCRIPTION OF THE DRAWINGS

It is clear that the features specified above and yet to be explained in more detail below can be used not only in the respectively specified combination but rather also in other combinations or individually without departing from the scope of the present invention.

Exemplary embodiments of the invention are illustrated in the drawing and are explained in more detail in the following description, in which:

In FIG. 1, a drivetrain of a motor vehicle is denoted generally by 10.

PREFERRED EMBODIMENT OF THE INVENTION

Figure 1:
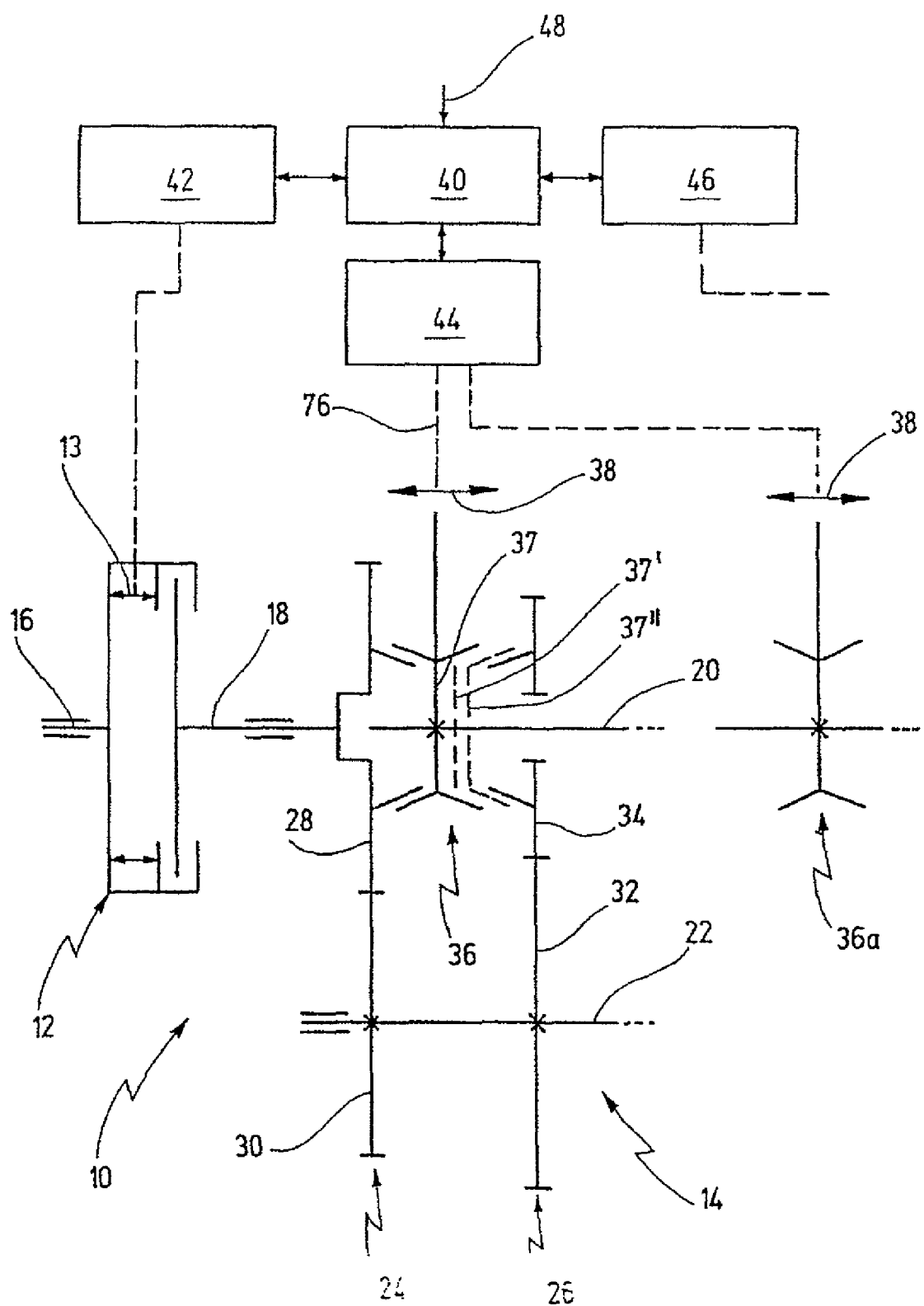
FIG. 1 shows a diagram of a known drivetrain.

The drivetrain 10 comprises a friction clutch 12, which acts as a separating or starting clutch, and a multi-stage gearbox 14. Although a single multi-stage gearbox is shown here, the invention explained below may also be used in double-shift gearboxes.

The separating clutch (SECL) 12 is a friction clutch which can be actuated by means of a schematically indicated clutch actuator 13. In a closed position, the separating clutch 12 connects an engine drive output shaft (OS) 16 in a non-positively locking fashion to an input shaft 18 of the gearbox 14. In an open position, the two shafts 16, 18 are separated from one another. During the opening and closing of the separating clutch 12, the separating clutch 12 runs through a dragging phase. Here, two elements of the separating clutch 12 at different rotational speeds come into sliding engagement with one another. At a so-called "dragging point", the clutch actuator 13 has placed the two clutch elements which are rotating at different rotational speeds so close to one another that a predefined (low) drag torque is transmitted from the engine drive output shaft 16 to the gearbox drive input shaft 18. The clutch elements are then however still at different rotational speeds.

The multi-stage gearbox 14 transmits the power of the engine of the motor vehicle from the gearbox input shaft or the drive input shaft (IS) 18 to a gearbox output shaft or a drive output shaft (OS) 20.

The multi-stage gearbox 14 is designed here by way of example, and in a manner known per se, as a countershaft gearbox and has a countershaft 22.

The multi-stage gearbox 14 comprises a multiplicity of gear sets, of which only two gear sets 24, 26 are shown in FIG. 1 in order to provide a clear illustration.

Each gear set 24, 26 comprises two gearwheels. In the illustrated embodiment, the gear set 24 comprises a gearwheel 28 which is fixedly connected to the drive input shaft 18 and a gearwheel 30 which is fixedly connected to the countershaft 22.

The second gear set 26 comprises a gearwheel 32 which is fixedly connected to the countershaft 22 and a gearwheel 34 which is mounted on the drive input shaft 20 and which is designed as a loose gear.

A shift clutch (SHCL) which is formed as a synchronizing device 36 is arranged on the drive output shaft 20 between the gear sets 24, 26.

The synchronizing device 36 is shown in FIG. 1 in a first closed position 37 in which the synchronizing device 36 connects the gearwheel 28 and the drive output shaft 20 to one another in a positively locking manner. FIG. 1 shows two further positions of the synchronizing device 36. In a second closed position 37", the synchronizing device 36 connects the gearwheel 34 of the second gear set to the drive output shaft 20 in a positively locking manner. Shown between the two closed positions 37, 37" is an open position 37' in which the synchronizing device 36 co-rotates on the drive output shaft 20 and connects neither the gearwheel 28 nor the gearwheel 34 to the drive output shaft 20.

During the engagement of a gear, that is to say as the synchronizing device 36 moves from the open position 37' into one of the closed positions 37, 37", said synchronizing device 36 is capable of reducing differential rotational speeds between the drive output shaft 20 and the gearwheel 28 or 34 to be connected thereto to be reduced to zero in order to thereby synchronize the two gearbox components.

The synchronizing device 36 can be moved back and forth on the drive output shaft 20 by means of an actuator 38 of the gearbox 14.

In addition to the gear sets 24, 26, the gearbox 14 also comprises further gear sets and correspondingly also further synchronizing devices, of which a further synchronizing device 36a is schematically shown in FIG. 1. The further synchronizing device 36a can likewise be actuated by means of a gearbox actuator 38.

During some gearshifts, a shift clutch 36 will be moved from its first closed position 37 through its open position 37' and into its second closed position. There are however likewise gearshifts during which for example the synchronizing device 36 will be moved from its first closed position 37 into its open position 37' and subsequently a further synchronizing device 36a will be moved from its open position into a closed position.

The motor vehicle in which the drivetrain 10 is installed also comprises a central controller 40, a clutch controller 42, a gearbox controller 44 and an engine controller 46. The clutch controller 42 and the gearbox controller 44 are connected to the clutch actuator 13 and to the gearbox actuator 38 respectively.

The engine controller 46 is connected to means for influencing the engine power, usually to a throttle flap.

The central controller 40 is connected to the clutch controller 42, the gearbox controller 44 and the engine controller 46, and coordinates their control functions. It is self-evident that the elements shown in FIG. 1 as individual controllers may be implemented in the form of software, wherein the individual controllers 42, 44 and 46 may in each case form individual program modules of an overall control program.

FIG. 2 again shows the drivetrain 10 of FIG. 1, but in highly schematized form. An engine 48 is shown as a block. It is also illustrated that the drive output shaft 20 is connected to drive wheels 50, for example of a motor vehicle (not illustrated in any more detail).

By means of the separating clutch 12 and the shift clutch (es) 36, the drivetrain 10 can be divided into three parts which can rotate in each case at different rotational speeds. To determine the different rotational speeds, the corresponding shafts are connected to rotary transducers. The engine shaft 16 is connected to a rotary transducer in order to determine the engine rotational speed $n_M$. The drive input shaft 18 is connected to a further rotary transducer in order to determine the drive input shaft rotational speed $n_{AN}$. The drive output shaft 20 is connected to yet a further rotary transducer in order to determine the drive output shaft rotational speed $n_{AB}$; alternatively, the rotational speed of the wheels 50 could also be determined or measured.

Figure 2:
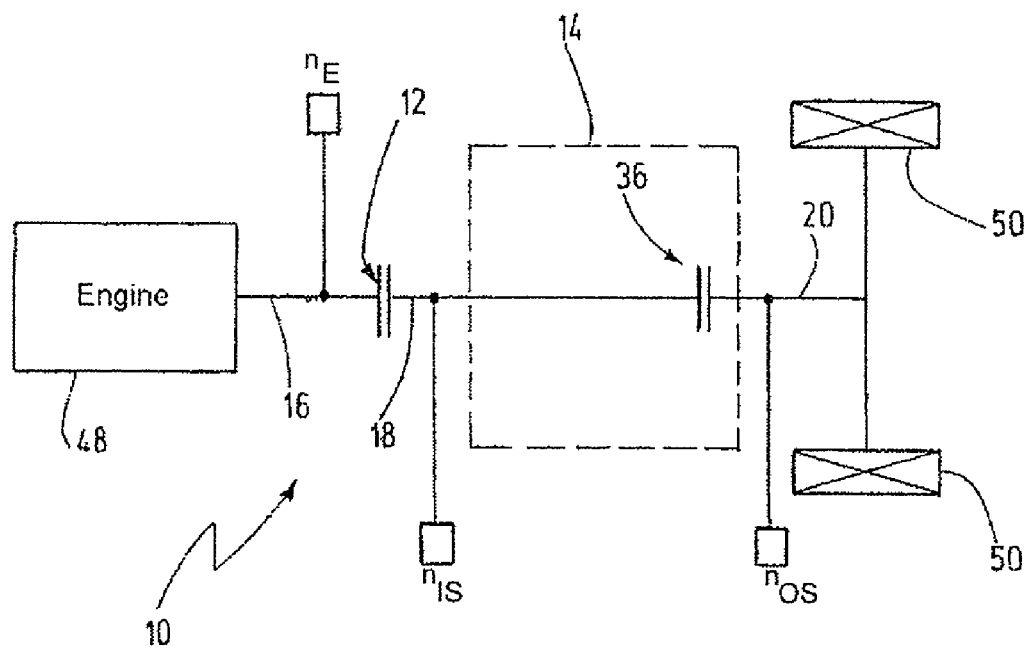
FIG. 2 shows a drivetrain of FIG. 1 illustrated in simplified form.

From FIG. 2, it can also be very clearly seen why the above-mentioned drag torque (separating clutch 12 "slightly" closed) is sufficient to synchronize the rotational speed of the drive input shaft 18 with the rotational speed of the engine 48. In this case, the gearbox 14 has a relatively low overall mass in relation to when the drive input shaft 18 is connected to the drive output shaft 20 (and therefore to the rest of the motor vehicle). When the shift clutch 36 is closed and the vehicle is in particular at a standstill, the drag torque which is transmitted by the separating clutch 12 in the dragging position cannot be sufficient to synchronize the rotational speeds of the shafts. If the rotational speeds were synchronized, the vehicle would have to move. The drag torque is thus preferably selected such that the vehicle does not move. On the other hand, said drag torque is already, and in particular exactly, sufficient to synchronize the drive input shaft—with the shift clutch open.

Figure 3:
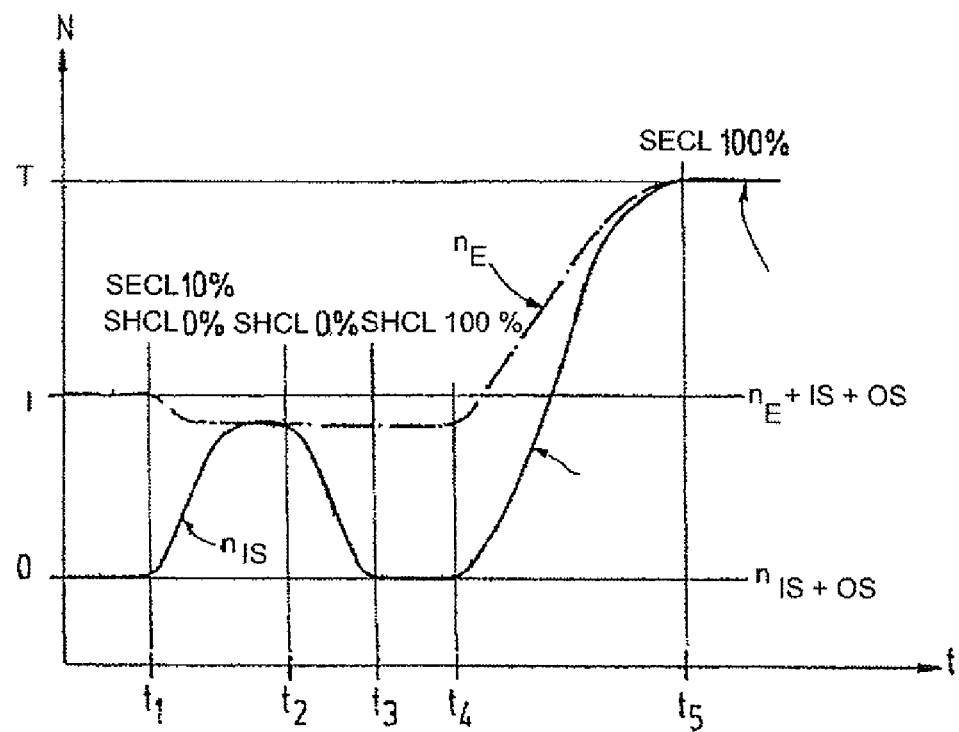
FIG. 3 shows a rotational-speed/time diagram during a process in which a gear is engaged from a neutral position, with the motor vehicle being stationary.

FIG. 3 shows a first application of the method according to the invention. Here, the first gear (target gear T) is engaged while the vehicle is at a standstill.

At the start, the engine shaft rotates at idle (I). The rotational speed $n_E$ of the engine is illustrated in FIG. 3 as a dash-dotted line.

The rotational speed $n_{IS}$ of the drive input shaft is zero at the start and is illustrated as a solid line.

At a time $t_0$, the separating clutch 12 is moved into the dragging position, for example by the clutch actuator 13 of FIG. 1. In FIG. 3, the dragging position is indicated by "SECL 10%". The shift clutch is opened at the time $t_1$, which is indicated in FIG. 3 by "SHCL 0%" (0% because the shift clutch is not closed). Once the separating clutch has been placed into the dragging position, a predefined low torque, preferably of a few Newton meters, is transmitted to the drive input shaft of the gearbox. The rotational speed $n_M$ of the engine therefore falls, wherein it has been assumed that no engine intervention (for example by means of a throttle flap) takes place in order to adjust the engine rotational speed, and the drive input rotational speed $n_{AN}$ rises until it has fallen in line with the engine rotational speed.

A gearshift demand occurs at a time $t_2$. The shift clutch begins to close. The drive output shaft and drive input shaft are thus connected to one another. The rotational speed of the drive input shaft falls further since the vehicle is stationary and the rotational speed of the drive output shaft is therefore zero. The actual synchronizing processes during the connection of the drive input shaft to the drive output shaft are not illustrated here in detail for reasons of simplicity. The same is true of the profile of the curve for the engine rotational speed.

At a time $t_3$, the shift clutch is fully closed (SHCL 100%). The drive input shaft and gearbox shaft are connected to one another in a non-positively locking manner. The first gear is engaged.

At a time $t_4$, the controller 40 begins to close the separating clutch fully. From this time onwards, an ever-increasing level of torque is transmitted from the engine shaft to the gearbox shaft. The rotational speeds of the shafts are brought ever more closely in line with one another.

At a time $t_5$, the separating clutch is fully closed (SECL 100%). The engine shaft, drive input shaft and drive output shaft all rotate at the same speed. It is self-evident that the engine power must be increased in the time period between $t_4$ and $t_5$ since the vehicle begins to move.

It is clear that the separating clutch may be opened fully again in the time period between $t_3$ and $t_4$. In this context, it is important merely that the separating clutch is in the dragging position (SECL 10%) in the time period between $t_1$ and $t_2$.

If a gear were engaged at the time $t_1$, the drive input shaft and the drive output shaft of the gearbox would have been connected to one another. The rotational speed $n_{AN}$ then would not have fallen in line with the engine rotational speed $n_M$. The rotational speed $n_{IS}$ would thus have continued to run horizontally (zero) and would therefore not have risen.

The behaviour of the drive input shaft rotational speed after the time $t_1$ is measured and followed. From the data obtained in this way, it is possible, for example by forming the derivative, to determine the gradient and therefore the change of the drive input shaft rotational speed. If no gradient is determined, it follows as a logical consequence that a gear is still engaged. The controller detects that a fault is present and can block the system in order to prevent further and more severe damage to the gearbox.

Figure 4:
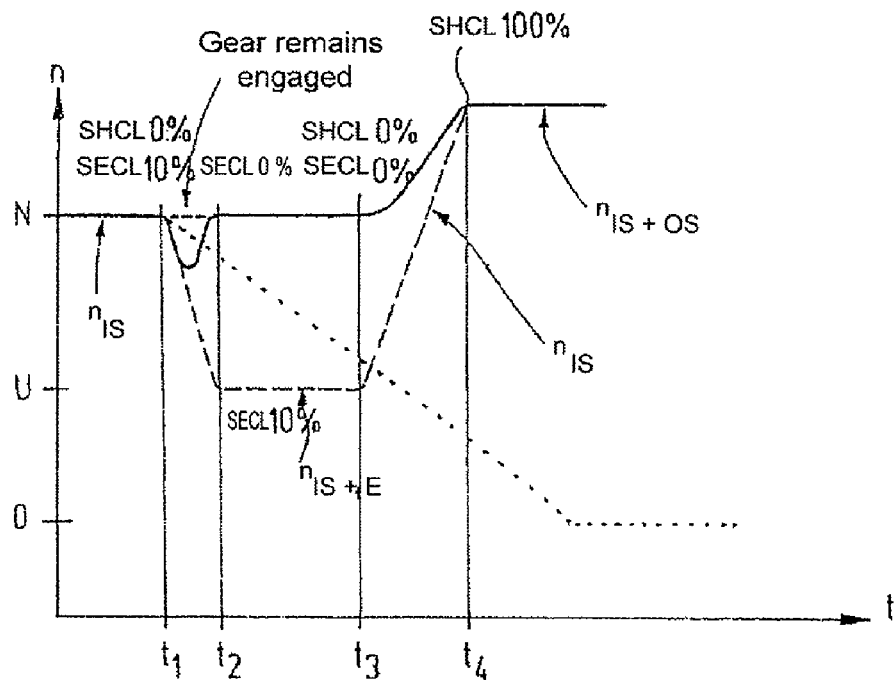
FIG. 4 shows a rotational-speed/time diagram depicting a process in which an upshift is carried out from a neutral position while the motor vehicle is travelling.

FIG. 4 shows an upshift process from a neutral position while the vehicle is travelling.

In the neutral position, the drive input shaft should be separated from the drive output shaft. Again, at the time $t_1$, the separating clutch is placed into the dragging position, and a relatively short time thereafter, is returned into the open position (SECL 0%). When the shift clutch is actually open, the rotational speed of the drive input shaft should move in the direction of a previously set rotational speed of the engine, in this case in the direction of an exemplary idle I. If, contrary to expectations, a gear remains engaged, the drive input shaft $n_{IS}$ would remain virtually unchanged.

A dotted line beginning at the time $t_1$ shows a situation which would arise if both the shift clutch and also the separating clutch were fully opened. The rotational speed of the drive input shaft would then move ever closer to zero, since the drive input shaft is no longer connected to either of the two other rotating shafts. To be able to better distinguish between said two rotational speed drops in the time period $t_2$-$t_1$, it is recommendable to set the engine rotational speed in the dragging position to a value which differs sufficiently from the rotational speed of a target gear, of a source gear and from the profile of the drive input rotational speed with the clutches fully open.

In FIG. 4, it can be easily seen that the drive input shaft rotational speed falls approximately twice as sharply as in the approach in which both clutches (SECL and SECL) are fully open.

The profile from the time $t_3$ onwards in FIG. 4 does not differ from the profile from the time $t_4$ onwards in FIG. 3.

FIG. 4, however, shows the situation in which the separating clutch is fully opened again after the test has been carried out during the time period $t_2$-$t_1$.

Figure 5:
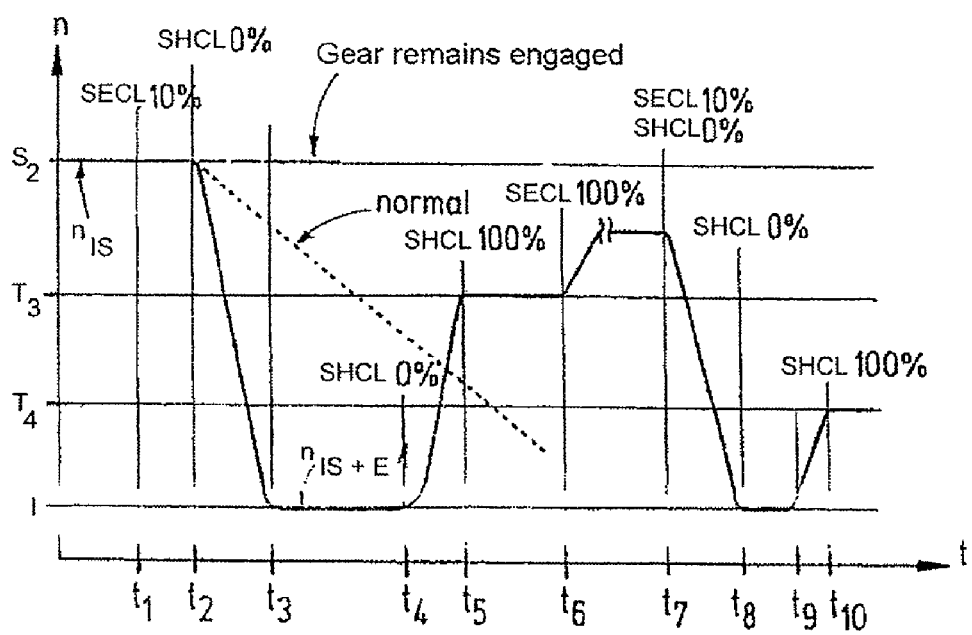
FIG. 5 shows a rotational-speed/time diagram depicting a process in which an upshift is carried out from the second gear into the third gear while travelling.

FIG. 5 shows a shift process in which a shift is carried out from the second gear into the third gear while travelling.

The rotational speed of the second gear (source gear) is denoted by S2. The rotational speed of a first target gear (third gear) is denoted by T3 and the rotational speed of a second target gear (fourth gear) is denoted by T4. Here, the engine rotational speed is again set to idle I. It is self-evident that the predetermined rotational speed of the engine during which the separating clutch is in the dragging position could be set to some other suitable value (other than I), for example to a value which is for example very much higher than S2, T3 and T4 or which lies in between. In special cases (adjacent gears), the engine rotational speed of the source gear may alternatively be maintained.

Before a time $t_1$, the shift clutch is closed, that is to say the drive input shaft and drive output shaft rotate at equal speeds. The separating clutch is likewise closed since the vehicle is travelling.

At the time $t_1$, the separating clutch is moved into the dragging position (SECL 10%). The drive input shaft and drive output shaft rotate for the time being at an unchanged speed, since the vehicle is still travelling.

At a time $t_2$, the shift clutch is opened, that is to say the drive input shaft and drive output shaft are separated. At this time, the rotational speed $n_{IS}$ falls in the direction of idle of the engine, since a torque (drag torque) is transmitted from the engine drive output shaft to the drive input shaft of the gearbox.

At a time $t_3$, the gearbox input shaft is at the same speed as the engine.

If the gear had not actually been disengaged, the rotational speed of the drive input shaft would have remained virtually unchanged (indicated by dashed line in FIG. 5). In this case, the controller would detect that a fault is present.

At a time $t_4$, the gearbox receives a gearshift signal for an upshift from the second gear into the third gear. For this purpose, the synchronizing device of the third gear is placed gradually into engagement with the corresponding gearwheel. When the third gear is engaged, the shift clutch is fully closed (SHCL 100%, time $t_5$). The separating clutch is subsequently likewise closed. This process ends at the time $t_6$ (SECL 100%). Here, it is implicitly assumed that the engine power has been correspondingly increased. When the separating clutch is closed, the vehicle can continue to travel in the third gear.

From the time $t_7$ onwards, a further shift process into the fourth gear is illustrated by way of example. This is not discussed in any more detail, since it is merely a repetition of the process already explained for the shift from the second gear into the third gear.

Figure 6:
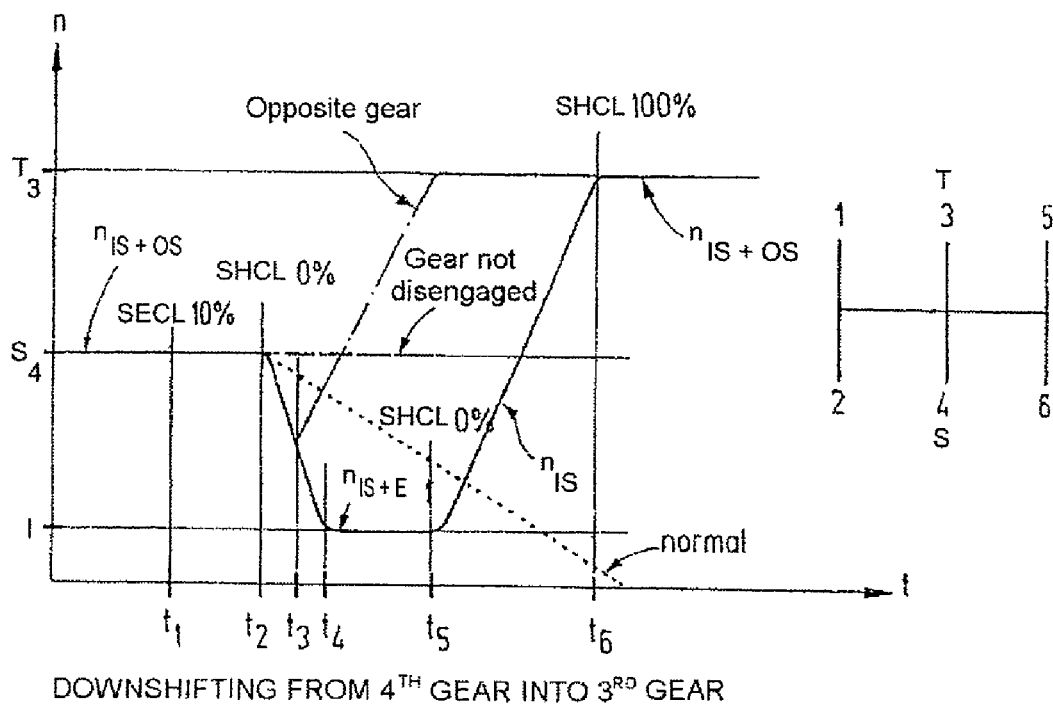
FIG. 6 shows a rotational-speed/time diagram depicting a process in which a downshift is carried out from the fifth gear into the fourth gear while travelling.

FIG. 6 shows, by way of example, a process in which a downshift is carried out from the fourth gear into the third gear. Also shown to the right of the diagram is a sketch of an H-gate.

For this purpose, at the time $t_1$, the separating clutch is placed into the dragging position. The shift clutch is subsequently fully opened at the time $t_2$. Normally, the rotational speed of the drive input shaft falls to the preset rotational speed of the engine (cf. $t_4$). The third gear may then be engaged, which in a known way rotates at a higher speed than the fourth gear. At the time $t_6$, the shift clutch of the third gear is fully closed.

Since it is however possible to dispense entirely with the information of travel sensors or with travel sensors themselves, it may occur that, during a shift process, two gears are actuated which are situated directly opposite, that is to say which are actuated by the very same synchronizing device. To prevent the synchronizing device then being moved too far, that is to say being decoupled from the source gear and already coupled into the possibly undesired opposite gear, the entire time profile of the drive input rotational speed during the time period $t_4$-$t_3$ is observed.

Once the synchronizing device engages into the opposite gear, a "beginning synchronization" of the opposite gear occurs, which is manifested in the settling of the rotational speed of the drive input shaft to a certain rotational speed level which is not equal to $n_I$ and which corresponds to the "wrong" gear. This is detected by the control unit. This is indicated by way of example in FIG. 6 by a dash-dotted line. It is self-evident that, depending on the gear pair and the actual state of the vehicle, a change in rotational speed may also occur, which is manifested not in a directional change as illustrated in FIG. 6 but rather in the setting of the rotational speed to a lower level (adjacent gear is a higher gear).

The controller can detect this state and then initiate suitable countermeasures for disengaging the unintended gear again.

Figure 7:
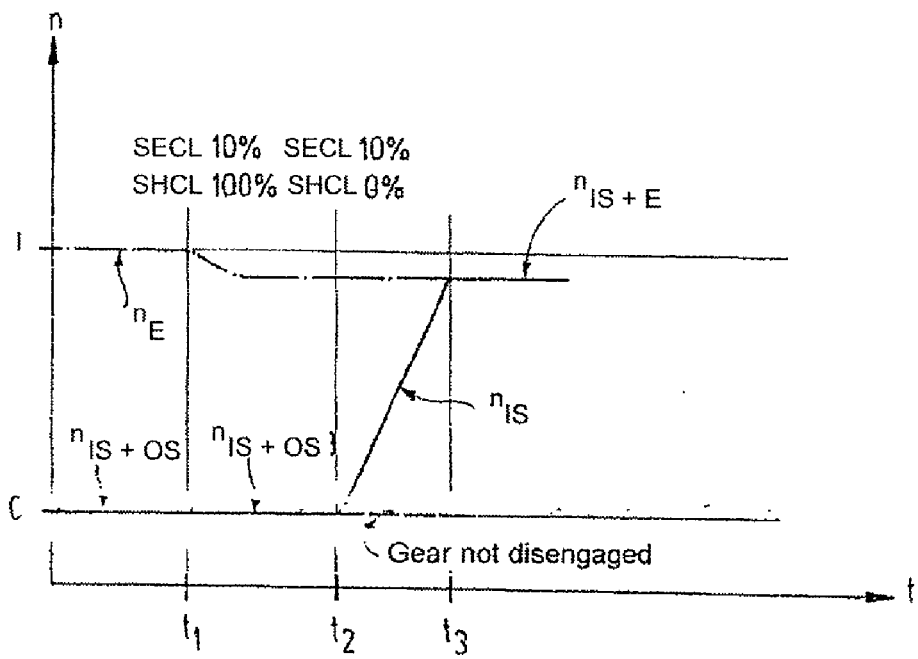
FIG. 7 shows a rotational-speed/time diagram depicting a process in which a downshift is carried out from a gear into the neutral position while at a standstill.

FIG. 7 shows a process in which a shift is carried out from an engaged gear into the neutral position, with the vehicle stationary.

Also here, the separating clutch is placed into the dragging position in a first step. The shift clutch is subsequently opened and the behaviour of the drive input rotational speed $n_{IS}$ is observed.

Should a gear remain engaged, the drive input rotational speed $n_{IS}$ would not fall in line with the engine rotational speed $n_E$.

Figure 8:
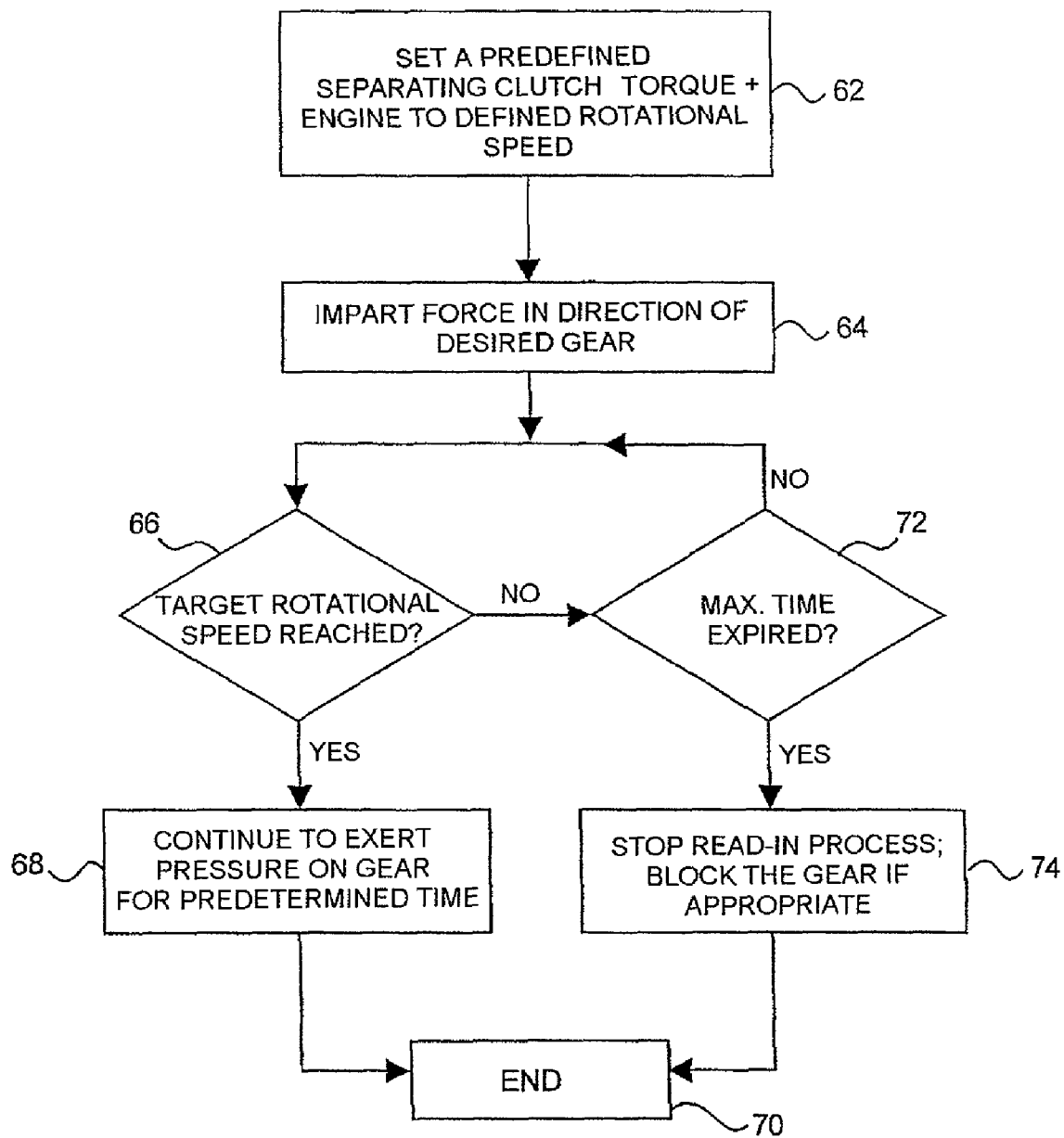
FIG. 8 shows a flow diagram illustrating an engagement process according to the present invention.

FIG. 8 schematically illustrates a flow diagram which shows a process in which a gear is engaged. FIG. 8 describes in particular an engagement process proceeding from a neutral position.

The separating clutch 12 is opened or closed by means of an actuation of the clutch actuator 13, to such an extent that the clutch elements are placed into the abovementioned dragging position. Here, a predefined clutch torque (drag torque), preferably of a few Newton meters, is transmitted (block 62). It must be possible to engage a gear counter to said clutch torque. Furthermore, the engine is brought to a rotational speed which is not equal to the rotational speed of the target gear (block 62). The engine 48 (cf. FIG. 2) is thus adjusted to a suitable rotational speed. Rotational speeds are particularly suitable which differ sufficiently from the rotational speed of the gear to be disengaged and/or the rotational speed of the gear to be engaged (during a shift from one gear to another) or the rotational speed of a wrong (opposite) gear.

A force is then exerted on the synchronizing device 36, for example hydraulically or electrically depending on the actuator 38 which is used, in order to force the synchronizing device 36 into one of its closed positions 37, 37″ (block 64).

When the drive input shaft 18 of the gearbox has reached the target rotational speed (block 66), an exertion of pressure on the target gear or on its synchronizing device 36 can continue for a predetermined time (block 68). The target gear is then engaged and the engagement program is ended for the time being (block 70).

If the target rotational speed has not yet been reached (block 66), wherein tolerances may be predefined, it is checked whether a maximum time has expired (block 72) within which the target rotational speed, inclusive of any tolerances, must be attained. Said maximum time constitutes a time limit for the process in order that, in the event of actual faults, no endless attempts to engage the target gear are made. The checking of the target rotational speed (block 66) is carried out until a predefined maximum time has expired. If the maximum time has expired without the target rotational speed having been reached, then the engagement process is stopped. The gear or the gearbox is if appropriate blocked (block 74).

Figure 9:
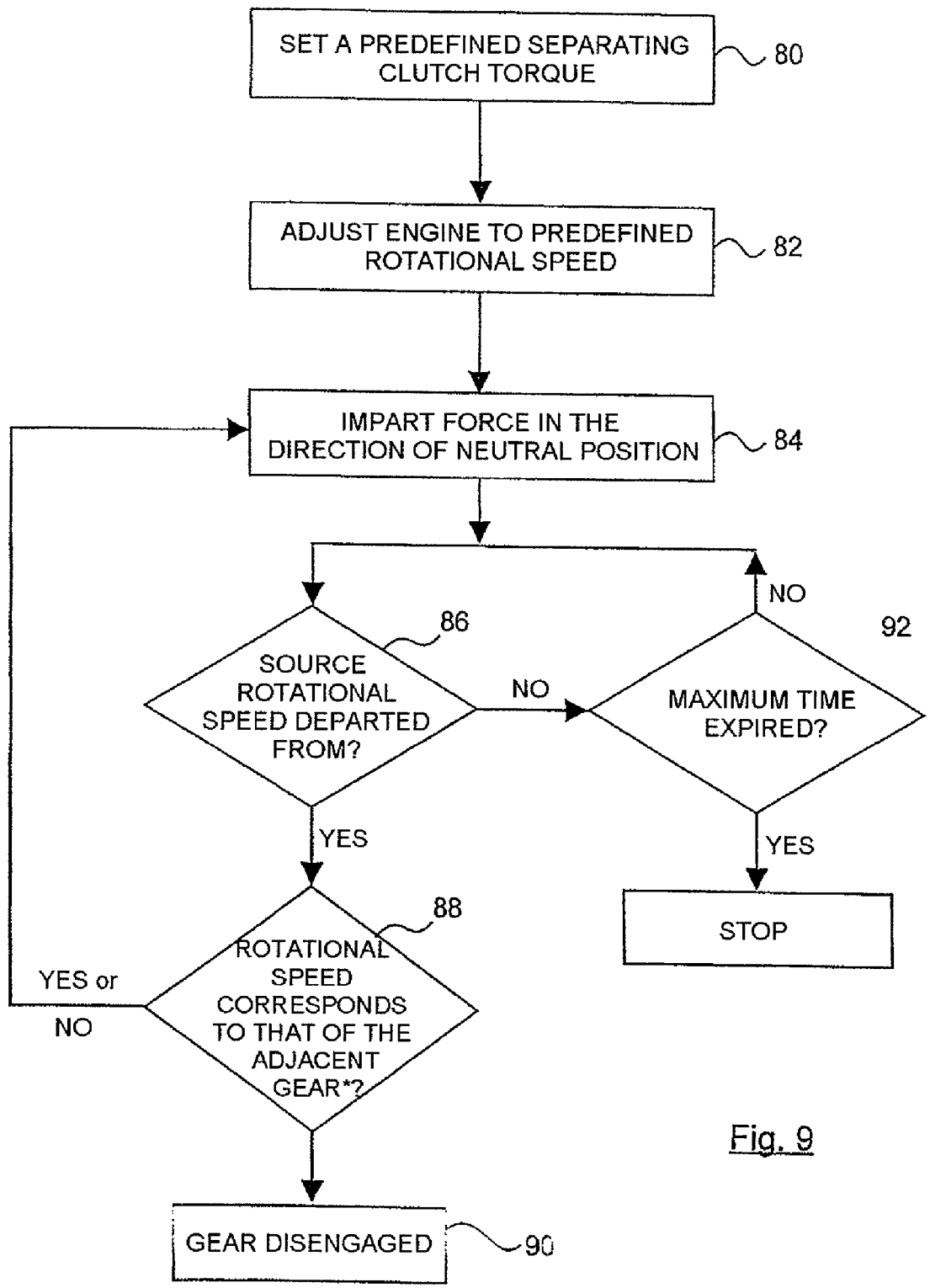
FIG. 9 shows a flow diagram illustrating a disengagement process according to the present invention.

FIG. 9 shows a flow diagram which illustrates a disengagement process according to the present invention using the example of a disengagement process from the gear position into the neutral position.

Here, the separating clutch 12 is placed into its dragging position such that a predefined clutch torque of a few Newton meters is transmitted (block 80). A disengagement of the source gear counter to said clutch torque should be possible.

The engine is adjusted to a rotational speed which is not equal to the rotational speed of the source gear. If a new gear should subsequently be engaged, then it is advantageous for the set rotational speed of the engine to not be equal to the rotational speed of the target gear or of the opposite gear. The rotational speed may however also be adjusted between the source gear and target gear. In particular, the rotational speed of the engine is adjusted below the lower rotational speed out of the source and target gears or above the higher rotational speed out of the source and target gears. The adjustment of the engine is illustrated in block 82.

A force is then exerted on the gearbox actuator 38, specifically in such a way that the synchronizing device 36 is moved in the direction of its neutral position or open position (block 84).

It is then checked whether the rotational speed of the source gear has been departed from (block 86).

If the source rotational speed has been departed from, it can be checked whether the rotational speed of a gear which is adjacent to the source gear (cf. closed positions 37 and 37″ in FIG. 1) is reached (block 88). Alternatively, it may be checked whether the drive input shaft has reached the (previously) set engine rotational speed. Here, it should additionally be noted that, in the present description, it is implicitly assumed throughout that a travelling speed remains constant during the shift. In practice, this may also be different, and therefore said effect must correspondingly be taken into consideration when selecting a suitable engine rotational speed.

Should the rotational speed move in the direction of the rotational speed of the adjacent gear, a further (opposite) force is exerted on the synchronizing device 36 in order to move the synchronizing device 36 into its neutral position 37' (cf. block 84). However, if the rotational speed of the gearbox drive input shaft 18 does not move towards the rotational speed of the adjacent gear, then the source gear is disengaged (block 90).

If the check in the block 86 yields that the source rotational speed has not yet been departed from, then it is checked whether a maximum time has expired (block 92). If the maximum time has not yet expired, then the exertion of force is continued and it is checked again whether the source rotational speed has been departed from. However, if the maximum time has expired and the source rotational speed has not been departed from, then it is to be assumed that a fault is actually present, and so the disengagement process is stopped (block 94). This may take place if appropriate by blocking the (partial) gearbox.

The "maximum times" specified in conjunction with FIGS. 8 and 9 constitute waiting times which should be adapted to the respective system and the prevailing conditions (temperature etc.). The actuation of the actuator arrangement of a gear usually takes place according to defined time profiles. The times which are usually required to engage or disengage a gear are dependent on the gearbox and are known to a person skilled in the art.

It is also clear that the neutral position of the gearbox, when no gear is engaged, is encompassed by the expressions "source gear" and "target gear" where the present description is discussing a shift process. If a gear is disengaged, then the neutral position (for the time being) constitutes a "target gear", which applies to the wording of the following claims.

We claim:

1. A method for shifting gears in an automatic multi-stage gearbox of a motor vehicle, wherein the gearbox comprises a drive input shaft connectable to an engine output shaft by means of a friction clutch, which acts as a separating clutch, and a drive output shaft couplable to a drive wheel or drive wheels of the motor vehicle, wherein a shift process takes place as a function of rotational speeds of the shafts, wherein each gear is assigned a synchronizing device, which acts as a shift clutch, in order to connect the drive input shaft to the drive output shaft, comprising the following steps:

setting the separating clutch into a dragging position such that a low drag torque is transmitted from the engine drive output shaft to the drive input shaft, which drag torque is sufficient to bring a rotational speed of the drive input shaft, when the shift clutch is open, to a rotational speed of the engine drive output shaft;

adjusting the rotational speed of the engine drive output shaft to a predetermined value which differs sufficiently from a rotational speed of a source gear or from rotational speed of a target gear;

setting the shift clutch of the source gear towards an open position in order to separate the drive input shaft and drive output shaft from one another;

detecting the rotational speed of the drive input shaft for a predetermined time period which follows at least a time when the shift clutch of the source gear is in the open position;

determining a change in the rotational speed of the drive input shaft during the predetermined time period; and determining whether the change which is determined in this way lies within predefined tolerances of an expected rotational speed change.

2. The method of claim 1, wherein the shifting process takes place only as a function of rotational speeds of the shafts.

3. The method of claim 1, wherein the low drag torque is predefined.

4. The method of claim 1, which further comprises the step:
if the rotational speed of the drive input shaft does not change to an expected value during the predetermined time period, resetting the shift clutch of the source gear in order to move into the open position.

5. The method of claim 1, which further comprises the step:
exerting an actuating force on a synchronizing device of the target gear in order to engage the gear.

6. The method according of claim 1, wherein the shift process is stopped if the rotational speed change which is determined in this way lies outside the predefined tolerances about the expected rotational speed change.

7. The method of claim 6, wherein one of the gear, in which the deviation was detected, and the entire gearbox is blocked.

8. The method of claim 1, wherein the separating clutch remains in the dragging position at least during said predetermined time period.

9. The method of claim 1, wherein a temporal course of the shift process takes place as a function of operating parameters.

10. The method of claim 9, wherein the operating parameters include temperature.

11. The method of claim 1, wherein the method is used as an emergency program if a travel sensor of one of the shift clutches fails.

12. The method of claim 11, wherein a change is made into an automatic mode in which the shift process is carried out only with an interruption of traction force.

13. The method of claim 1, wherein an engine intervention simultaneously takes place.

14. The method of claim 13, wherein the engine intervention takes place in order to keep the rotational speed of the engine shaft approximately constant during synchronization processes.

15. A control device for an automatic gearbox of a motor vehicle, which gearbox is suitable for carrying out a method comprising the steps:

setting the separating clutch into a dragging position such that a low drag torque is transmitted from the engine drive output shaft to the drive input shaft, which drag torque is sufficient to bring a rotational speed of the drive input shaft, when the shift clutch is open, to a rotational speed of the engine drive output shaft;

adjusting the rotational speed of the engine drive output shaft to a predetermined value which differs sufficiently from a rotational speed of a source gear or from rotational speed of a target gear;

setting the shift clutch of the source gear towards an open position in order to separate the drive input shaft and drive output shaft from one another;

detecting the rotational speed of the drive input shaft for a predetermined time period which follows at least a time when the shift clutch of the source gear is in the open position;

determining a change in the rotational speed of the drive input shaft during the predetermined time period; and determining whether the change which is determined in this way lies within predefined tolerances of an expected rotational speed change.

16. An automatic multi-stage gearbox for a motor vehicle, with the gearbox comprises a drive input shaft connectable to an engine drive output shaft by means of a friction clutch which acts as a separating clutch, and a drive output shaft couplable to a drive wheel or to drive wheels of the motor vehicle, wherein a shift process takes place as a function of rotational speeds of the shafts, wherein each gear is assigned a synchronizing device, which acts as a shift clutch, in order to connect the drive input shaft to the drive output shaft, and wherein the gearbox comprises a central controller which is suitable for carrying out a method comprising the steps of:

setting the separating clutch into a dragging position such that a low drag torque is transmitted from the engine drive output shaft to the drive input shaft, which drag torque is sufficient to bring a rotational speed of the drive input shaft, when the shift clutch is open, to a rotational speed of the engine drive output shaft;

adjusting the rotational speed of the engine drive output shaft to a predetermined value which differs sufficiently from a rotational speed of a source gear or from rotational speed of a target gear;

setting the shift clutch of the source gear towards an open position in order to separate the drive input shaft and drive output shaft from one another;

detecting the rotational speed of the drive input shaft for a predetermined time period which follows at least a time when the shift clutch of the source gear is in the open position;

determining a change in the rotational speed of the drive input shaft during the predetermined time period; and determining whether the change which is determined in this way lies within predefined tolerances of an expected rotational speed change.

17. The multi-stage gearbox of claim 16, which further comprises a clutch controller, a gearbox controller and an engine controller.

18. The multi-stage gearbox according of claim 16, which comprises only rotary transducers in order to be able to shift in a travel-sensor-independent fashion.

* * * * *